(12) United States Patent
Tanaka (10) Patent No.: US 7,940,161 B2
(45) Date of Patent: May 10, 2011

(54) READER/WRITER AND DATA COMMUNICATION METHOD

(75) Inventor: Yoshinori Tanaka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1044 days.

(21) Appl. No.: 11/589,935

(22) Filed: Oct. 31, 2006

(65) Prior Publication Data
US 2008/0001721 A1    Jan. 3, 2008

(30) Foreign Application Priority Data

Jun. 30, 2006 (JP) ................. 2006-181031

(51) Int. Cl.
*H04Q 5/22* (2006.01)
(52) U.S. Cl. ...................... 340/10.2; 340/10.3
(58) Field of Classification Search .......... 340/10.1, 340/10.31
See application file for complete search history.

(56) References Cited

U.S. PATENT DOCUMENTS

| | | | | |
|---|---|---|---|---|
| 5,485,154 | A * | 1/1996 | Brooks et al. ............... | 342/44 |
| 6,454,708 | B1 * | 9/2002 | Ferguson et al. ............ | 600/300 |
| 2005/0088286 | A1 * | 4/2005 | Heinrich et al. ........... | 340/10.51 |
| 2008/0094182 | A1 | 4/2008 | Sugano | |
| 2008/0150692 | A1 * | 6/2008 | Missimer et al. ........... | 340/10.1 |

FOREIGN PATENT DOCUMENTS

| | | |
|---|---|---|
| EP | 1544788 | 6/2005 |
| EP | 1916616 | 4/2008 |

OTHER PUBLICATIONS

"Information Technology Automatic Identification and Data Capture Techniques—Radio Frequency Identification for Item Management Air Interface—Part 6: Parameters for Air Interface Communications at 860-960 MHz," Chapter 8.2.5, *ISO/IEC*, Nov. 26, 2003.
"Information Technology—Radio-Frequency Identification for Item Management—Part 6C: Parameters for Air Interface Communications at 860 MHz to 960 MHz," Chapters 6.3.2.6-6.3.2.9, *ISO/IEC*, Jan. 7, 2005.
Eurpoean Search Report issued on Mar. 31, 2009 in EP application No. 06123464.7.

* cited by examiner

*Primary Examiner* — Benjamin C Lee
*Assistant Examiner* — Cal Eustaquio
(74) *Attorney, Agent, or Firm* — Fujitsu Patent Center (57) ABSTRACT

A reader/writer transmitting and receiving data, through wireless communications, to and from a passive type wireless tag having a nonvolatile storage unit, includes a tag selection unit selecting a target wireless tag performing the wireless communications with the reader/writer, a data transmitting/receiving unit executing data transmission/reception between the selected target wireless tag and the reader/writer, and a time information writing unit writing, when completing the data transmission/reception by the data transmitting/receiving unit, the time information on completion time of the data transmission/reception to the nonvolatile storage unit, wherein the tag selection unit selects the target wireless tag from within one or the plurality of wireless tags on the basis of the time information already written by the time information writing unit through the previous data communications with the reader/writer.

10 Claims, 6 Drawing Sheets

READER/WRITER AND DATA COMMUNICATION METHOD

BACKGROUND OF THE INVENTION

The present invention relates to a reader/writer transmitting and receiving data to and from a wireless tag through wireless communications, and relates to a data communication method performed between the wireless tag and the reader/writer.

In the case of transmitting and receiving the data batchwise such as reading and writing the data to and from a plurality of wireless tags existing in a communication-enabled range of a reader/writer capable of performing the wireless communications with a passive type of wireless tag, collision with other wireless tags is avoided by such a scheme that there be always one combination of a single communication-enabled wireless tag and the reader/writer (refer to, e.g., Non-patent documents 1 and 2). In these collision avoidance techniques, the wireless tag undergoing completion of a data transmitting/receiving process by the reader/writer is temporarily stored with a flag representing this completion status (which will hereinafter be referred to as a [completion flag]). This completion flag is designed to be retained for approximately 2 through 5 seconds by utilizing electric power accumulated in a capacitor etc within the wireless tag even if the power supply from the reader/writer is cut off.

Accordingly, the reader/writer is capable of distinguishing between the wireless tag undergoing the completion of the process by the reader/writer and the wireless tag not yet subjected to the process during the period for which to retain this completion flag. As a result, this enables the reader/writer to efficiently perform the data communications with the plurality of wireless tags.

[Non-patent document 1] ISO/IEC 18000-6 Type B (Chapter 8.2.5)

[Non-patent document 2] ISO/IEC 18000-6 Type C (Chapters 6.3.2.6-6.3.2.9)

SUMMARY OF THE INVENTION

In the case of performing the data communications between the plurality of passive type wireless tags and the reader/writer, improvement of accuracy of transmitting and receiving the data involves trying to transmit and receive the data in a plurality of different directions to and from the wireless tag by providing one reader/writer with a plurality of antennas. Herein, each of the antennas has a communication-enabled range, and hence it is impossible to transmit and receive the data to and from the wireless tag not existing in this range and further impossible to supply the electric power from the reader/writer.

Thus, when reaching a state of being unable to supply the electric power to the wireless tag from the reader/writer, the passive type wireless tag is hard to maintain the information of the completion flag, and therefore, if time required for the reader/writer to execute the processes for the plurality of wireless tags is longer than the time for which to retain the completion flag, it is difficult to distinguish between the wireless tag undergoing the completion of the process by the reader/writer and the wireless tag not yet subjected to the process. As a consequence, the efficient data communications between the wireless tag and the reader/writer are hindered.

Further, if configured to retain permanently the completion flag of the wireless tag, the reader/writer is, even if trying to execute a next different process (data transmission/reception) for the wireless tag, unable to execute the process at all for the wireless tag due to existence of the completion flag. Accordingly, the completion flag should be negated after an elapse of a fixed period of time, however, as described above, if the time till the negation thereof is short, inconvenience occurs. Such being the case, it is considered that the wireless tag is packaged with a capacitor having a large capacitance in order to elongate the completion flag retaining time, however, a cost for manufacturing the wireless tag rises.

It is an object of the present invention, in view of the problems described above, to provide a reader/writer transmitting and receiving the data to and from a passive type wireless tag and enabling efficient data communications with one or the plurality of wireless tags, and to provide a data communication method performed between the reader/writer and the wireless tag.

MEANS FOR SOLVING THE PROBLEMS

In the present invention, in order to solve the problems described above, time information, different from a completion flag, on completion time of a process by the reader/writer is written to a nonvolatile storage unit provided in the wireless tag. Then, the data communications between the reader/writer and the wireless tag are controlled based on the time information written thereto, whereby the data communications can be made more efficient.

More specifically, the present invention is a reader/writer transmitting and receiving data, through wireless communications, to and from a wireless tag having a storage unit, comprising a tag selection unit selecting a target wireless tag performing the wireless communications with the reader/writer from within one or a plurality of wireless tags, a data transmitting/receiving unit executing data transmission/reception between the target wireless tag selected by the tag selection unit and the reader/writer, and a time information writing unit writing, when completing the data transmission/reception by the data transmitting/receiving unit, the time information on completion time of the data transmission/reception to the storage unit provided in the target wireless tag, wherein the tag selection unit selects the target wireless tag from within one or the plurality of wireless tags on the basis of the written time information through the previous data communications with the reader/writer.

A characteristic point of the reader/writer according to the present invention is that when the data transmitting/receiving unit transmits and receives the data to and from the wireless tag, in place of a conventional completion flag purporting the completion of data transmission/reception, the time information about the time when completing the data transmission/reception is stored in the storage unit by the time information writing unit. The storage unit is of a nonvolatile type and therefore retains the time information even if the power supply from the reader/writer is cut off in the wireless tag.

Then, the process between the reader/writer and the wireless tag is executed based on the time information within the storage unit provided in each wireless tag after the tag selection unit has selected the wireless tag (which is the target wireless tag described above) serving as a processing target tag. As for this time information, the information written before is retained even if the power supply from the reader/writer is cut off as explained above, and hence the tag selection unit surely executes the selection of the target wireless tag, whereby it follows that this serves to make efficient the data communications between the reader/writer and the wireless tag.

Moreover, the information written to nonvolatile storage unit is essentially the information related to the time and does not therefore attach a value representing the completion of the data transmission/reception directly to the wireless tag as by the conventional completion flag. Accordingly, even if the time information continues to be retained, this does not mean that the tag selection unit always recognizes the wireless tag as being [completion of data transmission/reception], and it is feasible to elastically select the wireless tag such as selecting a specified wireless tag as the target wireless tag on the basis of the time information.

Herein, the time information written to the storage unit of the wireless tag is preferably the information related to the systematic time managed on the side of the reader/writer. In a case where a plurality of reader/writers executes the processes for the wireless tags, the time is systematically managed between the reader/writers, whereby more accurate processing based on the time information can be attained. The time information may be, e.g., year, month, date, hour, minute and second and may also be a character string representing these time units equivalently, and further information not directly related to the time but related to the processing may be attached in the form of being connected to the information related to the time.

Moreover, the time information within the storage unit of the wireless tag may be overwritten for every writing process by the time information writing unit, or alternatively plural pieces of time information are written in the sequence from the latest, wherein there may be provided a state enabling a write history to be known. In this case, the tag selection unit can select the target wireless tag on the basis of the write history.

Herein, in the reader/writer, the wireless tag may further include a temporary storage unit enabled to temporarily store the data by its being supplied with electric power from the reader/writer, the reader/writer may further include a completion flag writing unit writing, when completing the data transmission/reception by the data transmitting/receiving unit, a completion flag representing completion of the data transmission/reception to the temporary storage unit provided in the target wireless tag, and the tag selection unit may select the target wireless tag on the basis of any one of the written time information and the written completion flag in accordance with a content of the data transmission/reception.

The temporary storage unit is the storage unit to which the conventional completion flag is written, and the information stored therein continues to be retained till the electric power supplies from the reader/writer is consumed up within the wireless tag. Namely, the reader/writer separately employs any one of the time information stored in the nonvolatile storage unit and the completion flag (corresponding to the conventional completion flag) stored in the temporarily storable unit, in other words, the temporary storage unit, corresponding to the content of the data transmission/reception conducted by the data transmitting/receiving unit, whereby the tag selection unit selects the target wireless tag.

Taking the time required for selecting the target wireless tag into consideration, normally the selection based on the completion flag is preferable in terms of reducing the time required for the selection thereof. As described above, however, the period for which to retain the completion flag is limited, and hence, in the case of expending a considerable period of time for the processing between the target wireless tag and the reader/writer, the selection based on the completion flag is not preferable. Further, the selection based on the completion flag is insufficient for selecting the target wireless tag simply from a point of view other than a point of view as to whether the previous process is terminated or not. It should be noted that the selection of the target wireless tag by the tag selection unit is not limited to this type of selection, and any suitable one of the completion flag and the time information may be utilized for every content of the data transmission/reception by the data transmitting/receiving unit.

In the reader/writer described above, the tag selection unit may select, as the target wireless tag, the wireless tag about which the already-written time information is the information registered earlier by a predetermined period of time than when being selected by the tag selection unit. This exemplifies one example of selecting the target wireless tag on the basis of the time information. In this case, it follows that the wireless tag about which the data transmission/reception by the data transmitting/receiving unit is finished earlier by the predetermined period of time or longer, is selected as the target wireless tag becoming a next target of the data transmission/reception by the data transmitting/receiving unit. It is to be noted that the predetermined period of time can be properly set corresponding to the content of the data transmission/reception and so on.

In the reader/writer described above, the selection of the target wireless tag, the data transmission/reception and the writing of the time information may be conducted for every single wireless tag.

Herein, the present invention can be gasped from an aspect of a data communication method by which to perform the wireless communications between a passive type wireless tag having a nonvolatile storage unit and a reader/writer. Namely, the present invention is a data communication method based on wireless communications performed between a wireless tag having a storage unit and a reader/writer, comprising a tag selection step of selecting a target wireless tag performing the wireless communications with the reader/writer from within one or a plurality of wireless tags, a data transmitting/receiving step of executing data transmission/reception between the target wireless tag selected in the tag selection step and the reader/writer, and a time information writing step of writing, when completing the data transmission/reception in the data transmitting/receiving step, the time information on completion time of the data transmission/reception to the nonvolatile storage unit provided in the target wireless tag, wherein the tag selection step includes selecting the target wireless tag from within one or the plurality of wireless tags on the basis of the time information already written in the time information writing step through the previous data communications with the reader/writer.

Also in the data communication method according to the present invention, similarly to the case of the reader/writer described above, the selection of the target wireless tag is surely executed in this tag selection step, whereby it follows that this serves to make efficient the data communications between the reader/writer and the wireless tag.

It is possible to provide the reader/writer transmitting and receiving data to and from the passive type wireless tag and enabling the efficient data communications with one or the plurality of wireless tags, and to provide the data communication method performed between the reader/writer and the wireless tag.

DETAILED DESCRIPTION OF THE INVENTION

Herein, embodiments of an RFID (Radio Frequency Identification) reader/writer (which will hereinafter be simply referred to as a [reader/writer]) and a data communication method according to the present invention, will be explained with reference to the drawings. It should be noted that configurations in the following embodiments are exemplifications, and the present invention is not limited to the configurations in the embodiments.

First Working Example

[Configuration of Device]

Figure 1:
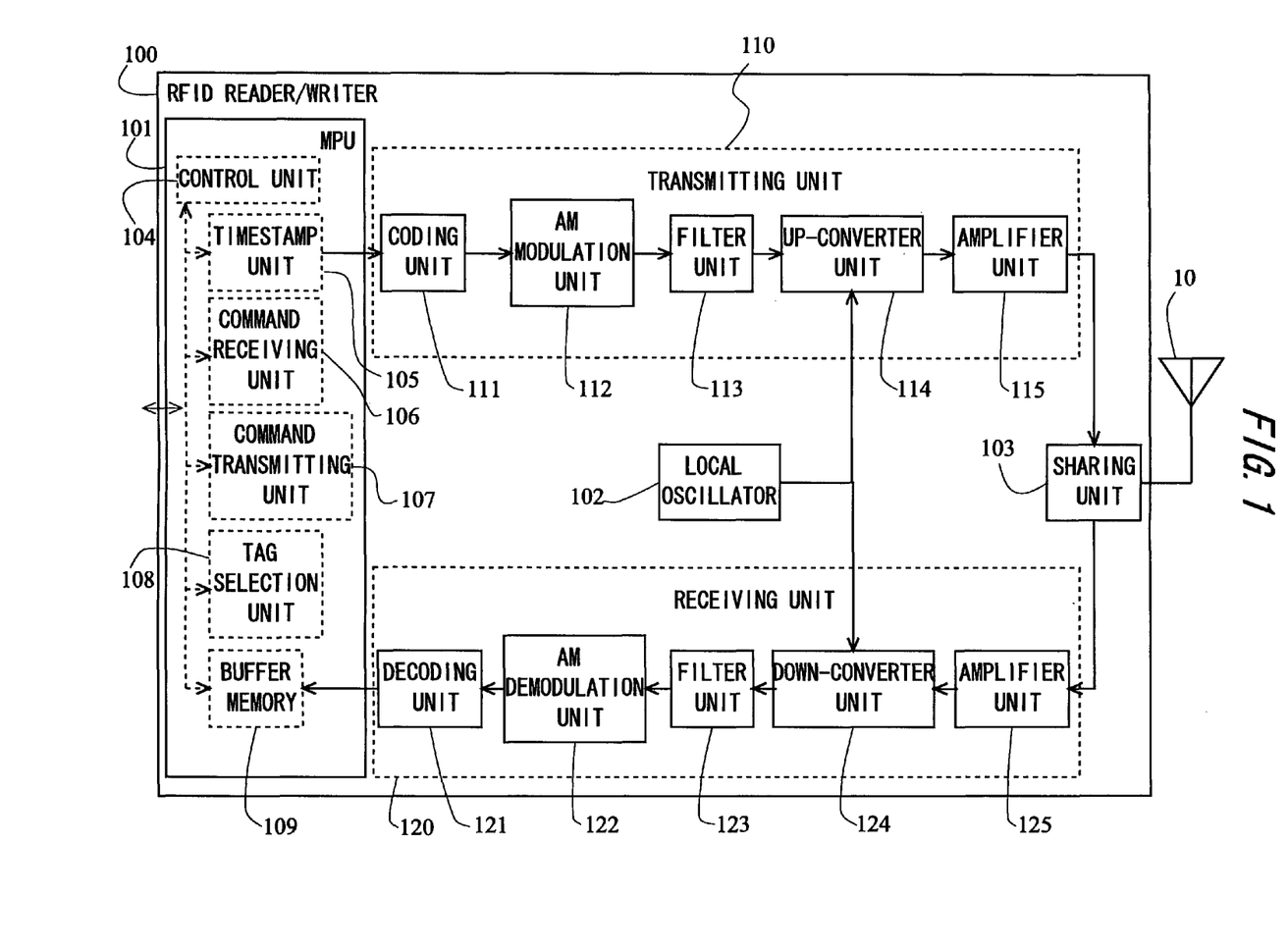
FIG. 1 is a diagram showing an outline of configuration of a reader/writer according to an embodiment (working example) of the present invention.

To start with, an outline of a device configuration of a reader/writer 100 will be described with reference to FIG. 1. FIG. 1 is a block diagram showing the device configuration of the reader/writer 100 according to a first working example. The reader/writer 100 is constructed of respective function units such as an antenna 10, a microprocessor (which will hereinafter be abbreviated to an MPU) 101, a local oscillator 102, a sharing unit (antenna duplexer) 103, a transmitting unit 110 and a receiving unit 120. Then, the transmitting unit 110 further includes a coding unit 111, an AM (Amplitude Modulation) modulation unit 112, a filter unit 113, an up-converter unit 114 and an amplifier unit 115. Moreover, the receiving unit 120 has a decoding unit 121, an AM demodulation unit 122, a filter unit 123, a down-converter unit 124 and an amplifier unit 125.

Figure 2:
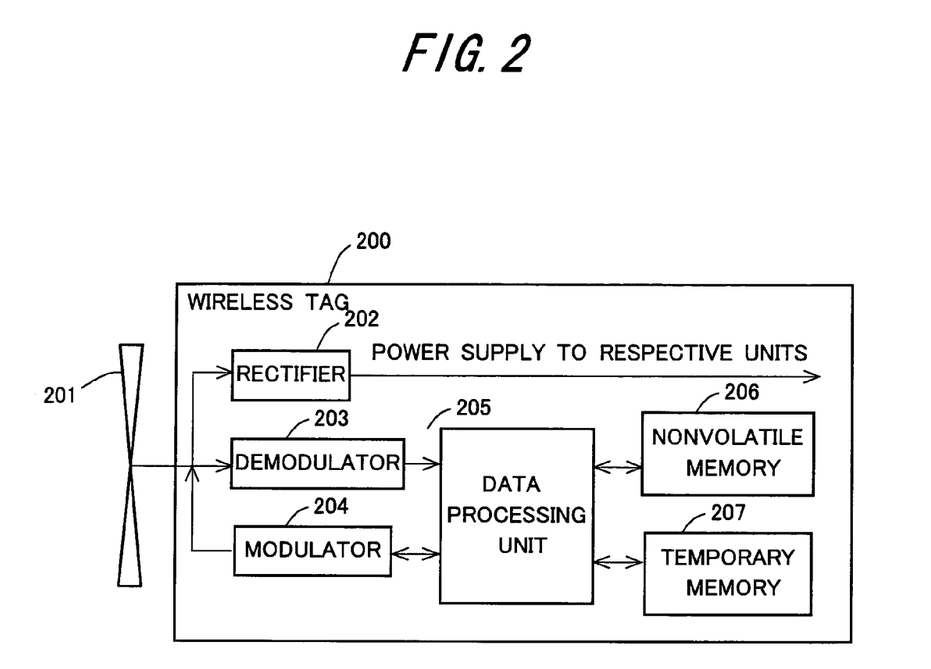
FIG. 2 is a diagram showing an outline of configuration of a wireless tag according to the embodiment of the present invention.

Furthermore, FIG. 2 illustrates an outline of a device configuration of a wireless tag 200 performing data communications with the reader/writer 100. The wireless tag 200 is a so-called passive type of wireless tag and includes respective function units such as an antenna 201, a rectifier 202, a demodulator 203, a modulator 204, a data processing unit 205, a nonvolatile memory 206 and a temporary memory 207. The nonvolatile memory 206 retains a storage content even when power of the wireless tag 200 drops, and corresponds to a nonvolatile storage unit according to the present invention. Further, the temporary memory 207 is a memory, capable of temporarily storing the data, of which a storage content disappears as the power of the wireless tag 200 drops, and corresponds to a temporary storage unit according to the present invention.

Herein, referring back to FIG. 1, the individual function units of the reader/writer 100 for actually performing the communications with the wireless tag 200 will be explained. The coding unit 111 codes transmission data (containing a read command, a write command, etc with respect to the wireless tag) transferred from the MPU 101, and transfers the coded signals to the AM modulation unit 112. The AM modulation unit 112 executes an amplitude modulation process with respect to the coded transmission signals. The modulated signals are transferred to the filter unit 113. The filter unit 113 extracts a signal having a desired frequency component from within the modulated signals. For instance, the frequency of the signal extracted herein may be changed corresponding to a frequency selected under transmission control by the MPU 101. The thus-filtered signal is transferred to the up-converter unit 114.

The up-converter unit 114 converts the filtered signal into a high frequency signal by mixing this filtered signal with an output signal from the local oscillator 102. The signal converted into the high-frequency signal is transferred to the amplifier unit 115. Note that the local oscillator 102 oscillates a predetermined frequency for conversion into a fixed high frequency signal in the up-converter unit 114. For example, the local oscillator 102 may also designate the should-be-oscillated frequency in order to transmit the signal via a predetermined channel selected under the control of the MPU 101.

The amplifier unit 115 amplifies the converted high frequency signal. The amplified signal is transmitted from the antenna 10 to the wireless tag 200 via the sharing unit 103. The sharing unit 103 is defined as a function unit for sharing the antenna 10 with the transmitting unit 110 and the receiving unit 120. The antenna 10 is employed for transmitting and receiving the radio waves to and from the wireless tag 200. The signals transmitted at the predetermined frequency from the antenna 10 are received by the wireless tag 200. Then, the wireless tag 200 transmits the signals in a way that carries the self-stored information etc on reflected waves of the received radio waves. It is to be noted that the first working example takes the configuration of sharing the single antenna 10 by providing the sharing unit (antenna duplexer) 103, however, the reader/writer 100 may be provided with two antennas for the transmission and for the reception.

Next, the respective function units constructing the receiving unit 120 will be explained. The amplifier unit 125 amplifies a feeble signal that was received by the antenna 10 and then transferred to the amplifier unit 125 via the sharing unit 103. The amplifier unit 125 may involve using a low-noise amplifier for reducing a noise of the signal to be amplified. The amplified signal is transferred to the down-converter unit 124. The down-converter unit 124 converts the amplified signal into a low frequency signal by mixing the amplified signal with an output signal from the local oscillator 102. The thus-converted signal is transferred to the filter unit 123.

The filter unit 123 extracts a signal having a desired frequency component from the converted signals. For instance, the frequency of the signal extracted herein may be changed corresponding to the frequency selected under the transmission control by the MPU 101. The thus-filtered signal is transferred to the AM demodulation unit 122. The AM demodulation unit 122 executes a demodulation process of demodulating the filtered signal. The demodulated signal is decoded by the decoding unit 121. The decoded data is transferred to the MPU 101.

Next, the respective function units of the wireless tag 200 performing the data communications with the reader/writer 100 will be described with reference to FIG. 2. The signals transmitted from the reader/writer 100 are received by the antenna 201. The signals received at this time are transferred to the rectifier 202 and to the demodulator 203. The wireless tag 200 is of the passive type and does not therefore include a battery inside thereof. Such being the case, the radio waves transmitted from the reader/writer 100 are rectified by the rectifier 202 into a direct current, and this direct current becomes the electric power supplied to the data processing unit 205 and to each memory. Further, the signals transmitted from the reader/writer 100 and then transferred to the demodulator 203 undergo a demodulation process in the demodulator 203 and are thereafter transferred to the data processing unit 205.

The data processing unit 205 executes a variety of processes in response to instructions (the read command, the write command, etc) sent mainly from the reader/writer 100. For example, the data processing unit 205 inputs and outputs, based on the instructions given from the reader/writer 100, the data to the nonvolatile memory 206 and to the temporary memory 207, which are electrically connected to the data processing unit 205. Note that a period of data retaining time of the temporary memory 207 is determined depending on a power supply quantity of the power generated by the rectifier 202. Further, a processing result of the data processing unit 205 is transferred to the modulator 204, wherein the processing result is subjected to the modulation process and then sent to the reader/writer 100 via the antenna 201.

Then, the data communications conducted between the reader/writer 100 and the wireless tag 200 are actualized in such a way that the respective function units described above are controlled by a control program executed by the MPU 101 mainly on the side of the reader/writer 100. An emphasis of the present invention is placed on a technology related to this type of data communication control, and hence the function units excluding the MPU 101 are not limited to those described above if configured to enable the actualization of the communications with the wireless tag 200.

The data communications, based on the MPU 101, between the reader/writer 100 and the wireless tag 200 are actualized by the communication control program stored in a buffer memory 109 within the MPU 101. Herein, a control unit (also serves as an completion flag write unit according to the present invention) 104, a timestamp unit (corresponding to a time information write unit according to the present invention) 105, a command receiving unit (corresponding to a data transmitting/receiving unit according to the present invention) 106, a command transmitting unit (corresponding to a data transmitting/receiving unit according to the present invention) 107, a tag selection unit (corresponding to a tag selection unit according to the present invention) 108, which are shown within the MPU 101 in FIG. 1, represent respective function images (program modules) of the communication control program executed by the MPU 101. Further, the MPU 101 may also transmit and receive the data to and from other control devices via an input/output interface (unillustrated).

Herein, the timestamp unit 105 executes a write process of writing a specified point of time (timestamp) managed on the side of the reader/writer 100 to the nonvolatile memory 206 of the wireless tag 200 through the wireless communications with the wireless tag 200. There may not be caused any inconvenience by attaching additional information other than information simply representing the time to the information on the time to be written. The command receiving unit 106 and the command transmitting unit 107 perform the reception and the transmission of the data from and to the transmitting unit 110 and the receiving unit 120 on the side of the reader/writer 100 described above via the demodulator 203 and the modulator 204 on the side of the wireless tag 200. The tag selection unit 108, because of there being a necessity of transmitting and receiving the data to and from the specified wireless tag 200 when a plurality of wireless tags 200 become data communication target tags with the reader/writer 100, selects this specified wireless tag 200 from within the plurality of wireless tags 200. A criterion for this selection is properly determined corresponding to a transmission/reception content in the data communications performed between the reader/writer 100 and the wireless tag 200. This point will be specifically described later on.

Then, the control unit 104 conducts the whole control by making adjustments among the timestamp unit 105, the command receiving unit 106, the command transmitting unit 107 and the tag selection unit 108, and executes, in addition, processes such as generating the variety of commands with respect to the wireless tag 200 and writing a completion flag to the temporary memory 207 of the wireless tag 200. This completion flag is a flag showing completion of a specified process (the data communications) between one wireless tag 200 and the reader/writer 100 when this specified process is completed. Accordingly, for instance, the reader/writer 100, if necessary for executing the process with respect to the plurality of wireless tags 200, can search for the wireless tag 200 with the process not yet completed on the basis of this completion flag.

Figure 3:
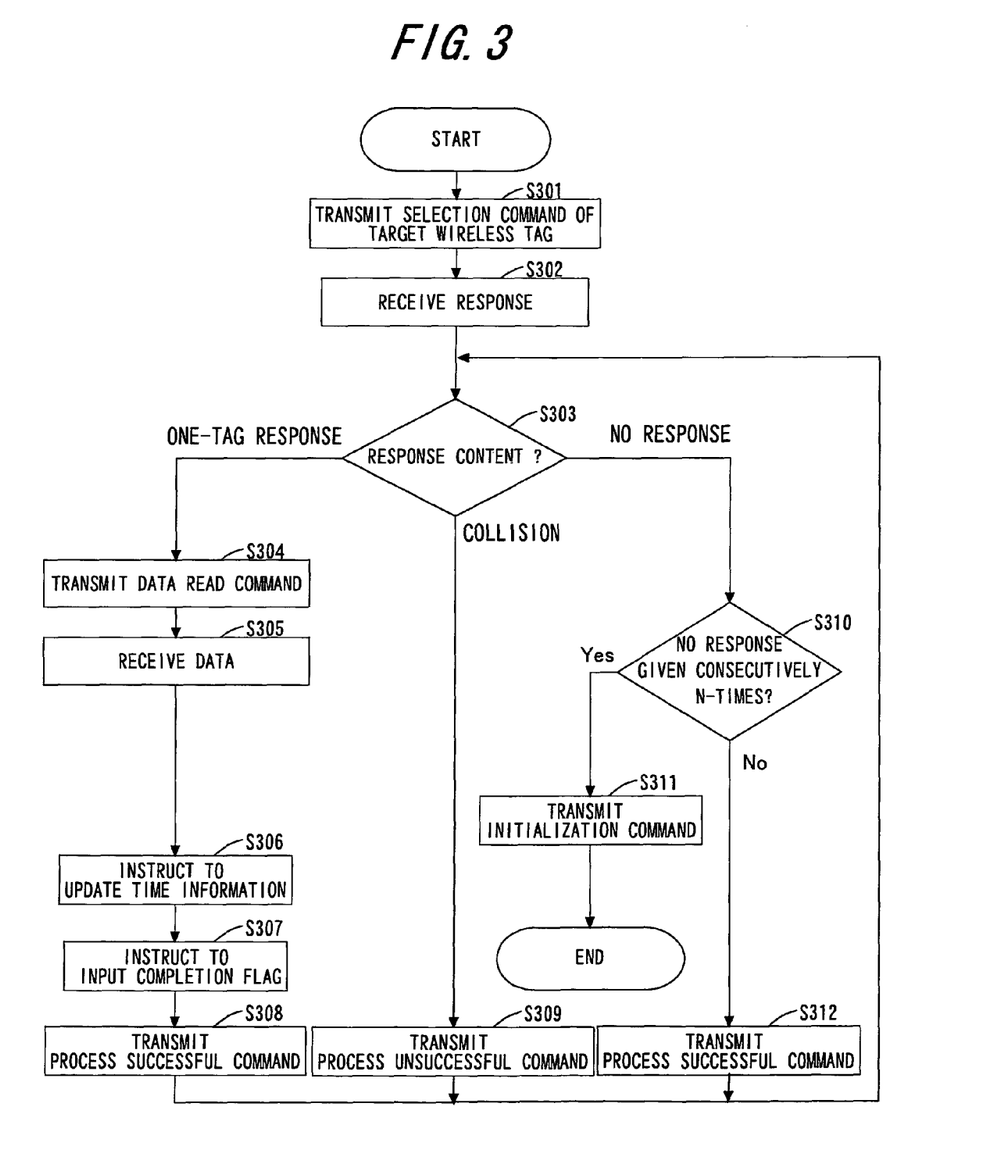
FIG. 3 is a flowchart showing a processing flow for transmitting and receiving data batchwise to and from a plurality of wireless tags, which are executed by the reader/writer according to the embodiment of the present invention.
Figure 4:
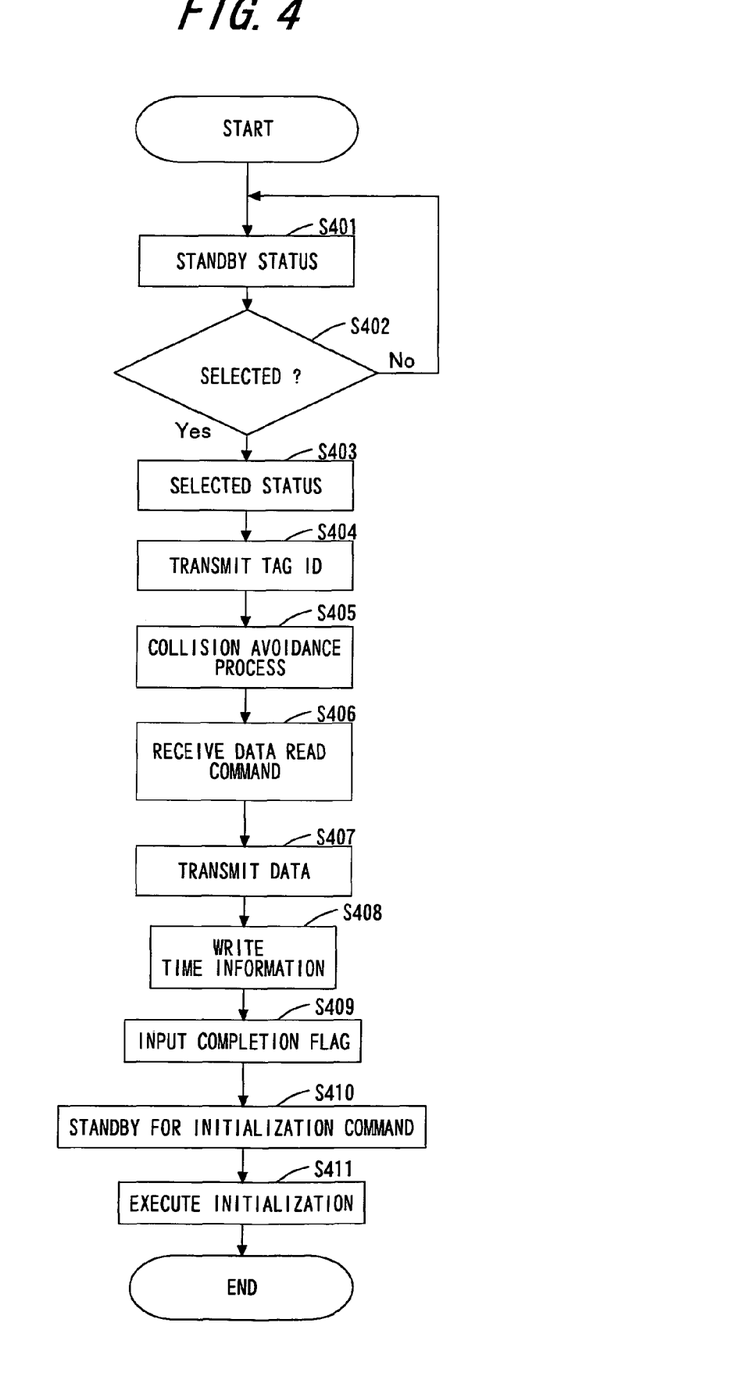
FIG. 4 is a flowchart showing a processing flow for transmitting and receiving data to and from the reader/writer, which are executed by the wireless tag performing data communications with the reader/writer according to the embodiment of the present invention.
Figure 5:
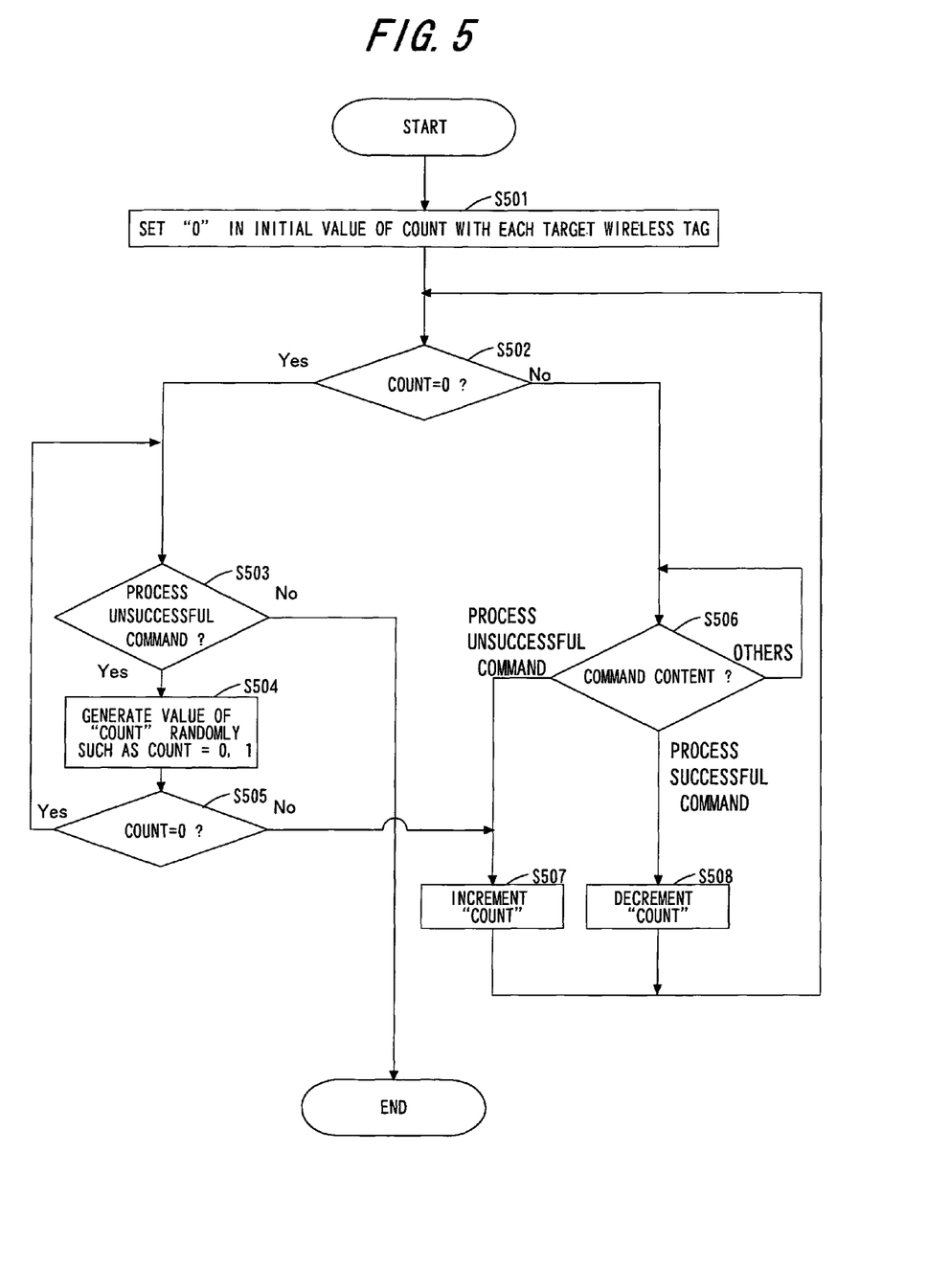
FIG. 5 is a flowchart showing a processing flow for avoiding collision among the wireless tags performing the data communications with the reader/writer according to the embodiment of the present invention.
Figure 6:
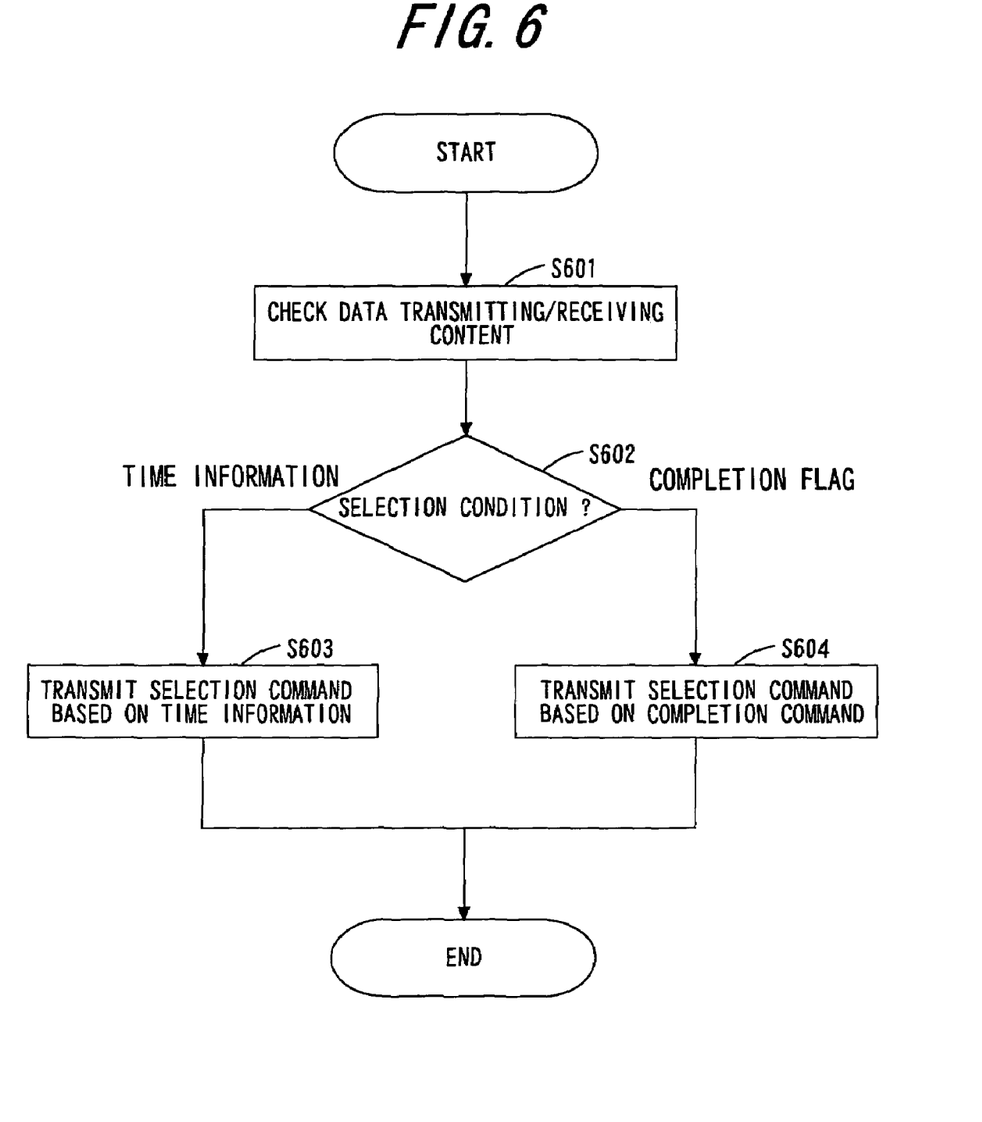
FIG. 6 is a flowchart showing a processing flow for selecting a target wireless tag becoming a data communication target tag, which is executed by the reader/writer according to the embodiment of the present invention.

A processing flow of the data communications performed between the reader/writer 100 and the plurality of wireless tags 200 according to the present invention, will be explained with reference to FIGS. 3 through 6. This process involves executing such a reading process that the reader/writer 100 reads batchwise the data from the plurality of wireless tags 200. This process is executed primarily by the MPU 101 on the side of the reader/writer 100 in accordance with the communication control program explained above, however, the data processing unit 205 on the side of the wireless tag 200 also executes part of this process, corresponding to the process by the MPU 101. Thus, the processes of the data communications are built up by the process executed on the side of the reader/writer 100 and by the process executed on the side of the wireless tag 200. This being the case, FIGS. 3 and 6 show a flow of the process executed mainly by the reader/writer 100, while FIGS. 4 and 5 show a flow of the process executed mainly by the wireless tag 200. The processing flows shown in the respective drawings will hereinafter be explained, however, as stated above, these processes are not executed unrelationally but are related to each other.

A control flow shown in FIG. 3 is explained. In S301, a selection command generated by the control unit 104 is transmitted to the plurality of wireless tags 200 via the command transmitting unit 107 in order to select the wireless tag becoming the target tag (which will hereinafter be referred to as a [target wireless tag]) of the data communications with the reader/writer 100. This selection command is attached with a specified condition for selecting the target wireless tag, and details of this condition will be explained later on with reference to FIG. 6. Upon finishing the process in S301, the operation proceeds to S302.

In S302, the command receiving unit 106 receives a response sent from the target wireless tag 200 conforming with the condition attached to the selection command. When finishing the process in S302, the operation proceeds to S303.

In S303, it is judged which category, (1) one-tag response, (2) collision or (3) no response, a content of the response given from the target wireless tag 200 and received in S302 comes under. The category [one-tag response] implies that there is a response from only one target wireless tag 200, in which case the reader/writer 100 can specify the single target wireless tag 200 as the data communication target tag, and hence the data communications with this target wireless tag 200 can be thereafter performed. Further, the category [collision] implies that there are responses from the plurality of target wireless tags 200, in which case the reader/writer 100 can not specify the single target wireless tag 200 as the data communication target tag, and therefore, if remaining as it is, the data communications with this target wireless tag 200 can not be performed. The category [no response] implies that there exists none of the wireless tag becoming the target wireless tag, in which case there might arise a possibility that the response from the wireless tag 200 does not reach the reader/writer 100 due to deterioration of a communication status between the reader/writer 100 and the wireless tag 200 for some reason, a case in which the selection command from the reader/writer 100 does not arrive at the wireless tag 200, a possibility that the should-be-selected wireless tag 200 does not exist (which includes a possibility that the processes with the reader/writer 100 are completed in all the wireless tags 200) and so on.

When transmitting the selection command to the plurality of wireless tags 200, normally the plurality of target wireless tags 200 exists, and hence at first the collision occurs with the result that it is impossible to execute the data communication process with the reader/writer 100.

This collision state is, however, obviated by executing a collision avoidance process that will be explained later on with reference to FIG. 5, whereby the data communications between the reader/writer 100 and each of the target wireless tags 200 come to be executed.

Herein, if judged to be [one-tag response] in S303, the operation proceeds to S304, wherein the data read command generated by the control unit 104 is transmitted via the command transmitting unit 107 to the target wireless tag 200 that has made the response. This data read command is a command for instructing the target wireless tag 200 to transfer a predetermined item of data possessed by the target wireless tag 200 to the reader/writer 100. Upon an end of the process in S304, the operation proceeds to S305.

In S305, the predetermined item of data is received in response to the data read command sent in S304 via the command receiving unit 106 from the target wireless tag 200 that is to transmit the predetermined item of data possessed by the wireless tag 200 itself. When the process in S305 is terminated, the operation advances to S306.

In S306, at a point of time when completing the data reception in S305, such an update instruction is issued via the timestamp unit 105 that the time information on this completion time is to be written to the nonvolatile memory 206 provided in the target wireless tag 200. This time information is the information representing the completion time of receiving the data determined based on the time (timestamp) managed on the side of the reader/writer. For example, the time information is exemplified by the time itself such as 30 June, 15:30:10:50. Further, the time information may also be structured by attaching this information with an ID number for identifying the reader/writer 100, and so forth.

Immediately after delivering the target wireless tag 200 from a factory and so on, none of the time information is written to the nonvolatile memory 206 thereof, however, it follows that a new piece of time information is written in the process in S306 in this case. On the other hand, in a case where some piece of time information was previously written in some process (which is the same as the process in S306) by the reader/writer 100, the time information is updated in the form of overwriting the old time information. Upon an end of the process in S306, the operation proceeds to S307.

In S307, an input instruction is issued in order to write the completion flag representing the completion of the data reception in S305 to the temporary memory 207 provided in the target wireless tag 200. This completion flag does not, unlike the time information described above, contain the time-related information at all, and is, further a storage location of this completion flag being the temporary memory 207 capable of storing for only a limited period during which the power of the target wireless tag 200 is maintained, different from the storage information of the time information described above. When finishing the process in S307, the operation advances to S308.

In S308, the control unit 104 generates a process successful command implying that a series of processes in S304 through S307 are terminated, and this process successful command is transmitted to the target wireless tag 200 via the command transmitting unit 107. Note that the wireless tag 200 receiving this process successful command specifies the target wireless tag 200 serving as a new data communication partner tag with the reader/writer 100 in the collision avoidance process that will be mentioned later on. After the process in S308, the process in S303 is again executed.

Moreover, if judged to be [collision] in S303, the operation proceeds to S309, wherein a processing command generated by the control unit 104 is transmitted to the wireless tag 200 via the command transmitting unit 107. This process unsuccessful command is a command implying that the data communication partner tag with the reader/writer 100 is not yet specified, and the wireless tag 200 receiving this process unsuccessful command specifies the target wireless tag 200 becoming the data communication partner tag with the reader/writer 100 in the collision avoidance process that will be described later on. After the process in S308, the process in S303 is again executed.

Further, if judged to be [no response] in S303, the operation advances to S310, and it is judged whether or not [no response] is repeated consecutively N-times. This predetermined number-of-times (predetermined count) "N" is a value that is properly determined, wherein if the response showing [no response] is given consecutively N-times, the data communications with all the target wireless tags 200 are treated as being finished on the assumption that there is no fault in the communications between the wireless tag 200 and the reader/writer 100. Then, if it is judged in S310 that [no response] is given consecutively N-times, the operation proceeds to S311, wherein an initialization command is sent to all the wireless tags 200. This initialization command is generated by the control unit 104 and transmitted to the wireless tag 200 via the command transmitting unit 107, and the wireless tag 200 receiving this command is reset as by the completion flag etc. Thereafter, the process on the side of the reader/writer 100 is finished.

Moreover, whereas if it is judged in S310 that [no response] is not given consecutively N-times, the operation proceeds to S312. In S312, in the same way as the process in S308, the process successful command is transmitted to the wireless tag 200, and again there is a wait for the response from the wireless tag 200. Thereafter, the process in S303 is again executed. This process is repeated till [no response] reaches the count "N", thereby enabling the reader/writer 100 to detect that the process of the data communication with the wireless tag 200 is completed.

What has been described so far is the details of the processes on the side of the reader/writer 100, and next a processing flow of on the side of the wireless tag 200 will be explained with reference to FIG. 4. In S401, upon receiving the radio waves from the reader/writer 100, the wireless tag 200 is supplied with the power and comes to a standby status. Thereafter, the operation advances to S402, wherein it is judged whether or not the wireless tag 200 is selected in accordance with the selection command sent in S301. Herein, the wireless tag 200 not selected returns to S401 in order to keep the standby status, while the selected wireless tag 200 advances to S403 and comes to a selected status. The wireless tag 200 reaching this selected status is the target wireless tag 200 described above. Note that the process of selecting the target wireless tag 200 from within the plurality of wireless tags 200 will be explained later on with reference to FIG. 6.

The target wireless tag 200 reaching the selected status transmits a tag ID for making self-identification to the reader/writer 100 in S404. To be specific, the data processing unit 205 sends the tag ID stored in the nonvolatile memory to the reader/writer 100 via the modulator 204. Herein, if the tag IDs are transmitted from the plurality of target wireless tags 200, the reader/writer 100 judges that [collision] described above occurs. Then, in such a case, the collision avoidance process, which will be explained later on, is executed in S405. Subsequently, when the response from the target wireless tag 200 comes to a status of [one-tag response] described above, the data read command transmitted in S304 is received in S406. The data processing unit 205 receives this data read command via the demodulator 203, then recognizes the command and transmits transmission request target data to the reader/writer 100 via the modulator 204 in S407. Herein, the transmission request target data are exemplified such as the data stored in the nonvolatile memory 206 of the target wireless tag 200 and other items of data detected by unillustrated sensors etc.

Then, when finishing the data transmission in S407, the operation proceeds to S408, wherein the data processing unit 205 receives from the reader/writer 100 the information related to the time when completing the data communications and writes this time-related information into the nonvolatile memory 206, corresponding to the updated time information in S306 described above. The in-depth description of this writing process is as given above.

Upon finishing the process in S408, the operation advances to S409, wherein the data processing unit 205 writes the completion flag into the temporary memory 207, corresponding to the input of the completion flag in S307. The detailed description of this writing process is as given above.

When the process in S409 is terminated, the operation proceeds to S410, wherein the target wireless tag 200 with the data communications completed stands by till the initialization command sent in S311 is transmitted thereto. In the meanwhile, the reader/writer 100 sequentially performs the data communications with the target wireless tags 200 through the collision avoidance process that will be mentioned later on, and, when eventually finishing the data communications with all the target wireless tags 200, it follows that the initialization command in S311 is transmitted. Then, when this initialization command is transmitted to the target wireless tag 200, the initialization is executed in the target wireless tag 200 in S411.

Herein, a flow of the collision avoidance process for controlling the sequence of the target wireless tags 200 performing the data communications so as not to cause the collision in the data communications with the reader/writer 100, will be explained with reference to FIG. 5. This collision avoidance process is a process executed on the side of the target wireless tag 200. To start with, in S501, an initial value of a parameter "COUNT" is set to "0" in each of the wireless tags 200 selected as the target wireless tags 200 by the selection command given from the reader/writer 100. This parameter "COUNT" is a parameter taking an integer value and is stored in the temporary memory 207 of each target wireless tag 200. When finishing the process in S501, the operation proceeds to S502.

In S502, it is judged whether the parameter "COUNT" set in the target wireless tag 200 is 0 or not. As a matter of course, initially 0 is set in the parameter "COUNT" in all the target wireless tags 200 in S501, and hence this is judged affirmative, however, the parameter "COUNT" might take a value other than 0 by going through processes in S504, S507, S508. Herein, if judged affirmative, the operation proceeds to S503, wherein it is judged whether or not the reader/writer 100 transmits the process unsuccessful command, i.e., whether or not the collision occurs among the target wireless tags 200. The judgment in S503 is based on the command (transmitted in S304, S308, S309, S311 and S312) transmitted by the reader/writer 100, corresponding to the tag ID sent from the target wireless tag 200.

When judging in S503 that the process unsuccessful command is transmitted, the operation advances to S504, wherein 0 or 1 is randomly set afresh in the parameter "COUNT" in the target wireless tags 200 in which 0 is set in the parameter "COUNT" at this point of time. Accordingly, the target wireless tags 200 are classified at a ratio of 50:50 in terms of probability into the target wireless tags 200 in which 0 is set in the parameter "COUNT" and the target wireless tags 200 in which 1 is set in the parameter "COUNT". Thereafter, in S505, the process in S503 is again executed with respect to the target wireless tags 200 in which 0 is set in the parameter "COUNT". On the other hand, it follows that the process in S507 is executed with respect to the target wireless tags 200 in which 1 is set in the parameter "COUNT". The process in S507 will be explained later on. While on the other hand, when judging in S503 that the process unsuccessful command is not transmitted, it follows that none of the collision occurs among the target wireless tags 200, and the present process comes to an end.

Further, the judgment in S506 is made with respect to the target wireless tags 200 judged to be negative in S502, i.e., judged not to be 0 in the parameter "COUNT". The judgment in S506 is based on the command (transmitted in S304, S308, S309, S311 and S312) transmitted by the reader/writer 100, corresponding to the tag ID sent from the target wireless tag 200. When judging in S506 that the process unsuccessful command is transmitted from the reader/writer 100, the operation advances to S507, wherein the value of the parameter "COUNT" is incremented by 1 in the target wireless tags 200 judged not to be 0 in the parameter "COUNT" in S502. Thereafter, the process in S502 is again executed. Moreover, when judging in S506 that the process successful command is transmitted from the reader/writer 100, the operation advances to S508, wherein the value of the parameter "COUNT" is decremented by 1 in the target wireless tags 200 judged not to be 0 in the parameter "COUNT" in S502. Thereafter, the process in S502 is again executed. Moreover, in the case of commands other than this command, the process in S506 is carried out again.

Thus, the value in the parameter "COUNT" set in each of the target wireless tags 200 is incremented or decremented corresponding to the process unsuccessful command or the process successful command sent from the reader/writer 100, and resultantly the target wireless tags 200 are hierarchized and thus sequenced, thereby making it possible to avoid the collision among the target wireless tags 200 performing the data communications with the reader/writer 100.

Herein, the process of how the reader/writer 100 selects the target wireless tag 200 will be explained with reference to FIG. 6. This process is a process related to S301 and S402 and is also a process executed by the MPU 101 of the reader/writer 100. To begin with, a transmission/reception content as an object of the data communications with the target wireless tag 200, which are conducted in S305, is checked in S601. Specifically, a length of time expended for the data communications with all the target wireless tags 200 is estimated based on the transmission/reception content. For instance, if there are plural pieces of data transmitted to the reader/writer 100 from the single target wireless tag 200, the time expended for the data communications is estimated corresponding to a data count thereof, and, in the case of transmitting and receiving a specified type of data, the time is estimated so as to require the time that is several times as much as the time for transmitting and receiving a normal type of data. Upon an end of the process in S601, the operation advances to S602.

In S602, a selection method of selecting the target wireless tag 200 is determined based on the time estimated (that will hereinafter be referred to as the [estimated time]) in S601, which is expended for the data communications. To be specific, if the estimated time is equal to or longer than reference time, a process in S603 is executed in order to select the target wireless tag 200 based on the time information stored in the nonvolatile memory 206 provided in the wireless tag 200. Whereas if the estimated time is less than the reference time, a process in S604 is executed in order to select the target wireless tag 200 based on the completion flag stored in the temporary memory 207 provided in the wireless tag 200. An advantageous point of determining the selection method of selecting the target wireless tag 200 corresponding to the estimated time is that the time required for selecting the target wireless tag 200 can be decreased to the greatest possible degree by the selection based on the completion flag with respect to the data communications terminating in a comparatively short period of time, and another advantageous point is that the data communications can be executed more surely even when requiring a period of time over a retaining period of the completion flag by making the selection based on the time information if the data communications extend over a comparatively long period of time.

In S603, the selection command based on the time information is generated by the control unit 104 and is transmitted to the wireless tag 200 as shown in S301. Specifically, for example, in a case where the process with the previous wireless tag is conducted earlier by time T1, there is transmitted the selection command for selecting, as the target wireless tag 200, the wireless tag of which the nonvolatile memory 206 is stored with the time information registered earlier by the time T1 than the present time. The target selection command 200 selected by this operation becomes a processing target command from S403 onward shown in FIG. 4.

In S604, the selection command based on the completion flag is generated by the control unit 104 and is transmitted to the wireless tag 200 as shown in S301. Specifically, for example, there is transmitted the selection command for selecting, as the target wireless tag 200, the wireless tag about which the process with the reader/writer 100 is not yet completed, i.e., the completion flag is not set up. The target selection command 200 selected by this operation becomes the processing target command from S403 onward shown in FIG. 4.

In the process related to the selection of the target wireless tag 200 described above, the selection condition is determined based on the time information or the completion flag on the basis of the time (the estimated time) expended for the data communications, however, the selection condition determining method is not limited to this method. For instance, in the case of there being the necessity for performing some kind of data communications with the wireless tag having a specified item of time information, it may be sufficient that the target wireless tag is selected based on the time information in S602 in accordance with checking of the data transmission/reception content in S601.

In the data communications between the wireless tag 200 and the reader/writer 100 illustrated in FIGS. 3 through 6 which have been described so far, the target wireless tag 200 is selected based on the time information stored in the nonvolatile memory 206 provided in the wireless tag 200, and, when the process with the reader/writer is completed, the time information on the completion time is sequentially written to the nonvolatile memory 206. With this scheme taken, the data can be transmitted and received between the passive type wireless tag 200 and the reader/writer 100 without being affected by the retaining time of the completion flag.

While the invention has been described in detail with reference to preferred embodiments thereof, it will be apparent to one skilled in the art that various changes can be made, and equivalents employed, without departing from the scope of the invention. Each of the aforementioned documents, including the foreign priority document, JP 2006-181031 filed on 30 Jun. 2006 is incorporated by reference herein in its entirety.

What is claimed is:

1. A reader and writer configured to transmit and receive data, by wireless communications, to and from a wireless tag having a storage unit, said reader and writer comprising:
   a control unit configured:
      to execute data transmission or data reception between said reader and writer and a wireless tag;
      to transmit completion time information indicating completion time of said data transmission or said data reception to said wireless tag, said completion time information being stored in said storage unit; and
      to transmit a tag selection command including time information that is used by said wireless tag to judge whether said wireless tag is selected or not by comparing said stored time information and said completion time information.

2. A reader and writer according to claim 1, wherein the wireless tag further includes a temporary storage unit enabled to temporarily store the data by its being supplied with electric power from the reader and writer, and
   the control unit is adapted to transmit, when completing data transmission/reception by the reader and writer, a completion flag representing completion of the data transmission/reception to the temporary storage unit provided in the target wireless tag.

3. A reader and writer according to claim 2, wherein the reader and writer is adapted to estimate time required for the data transmission/reception in accordance with the content of the data transmission/reception executed by a data transmitting/receiving unit of the reader and writer, so as to select the target wireless tag on the basis of the completion time information written when the estimated time is equal to or longer than a predetermined period of time, and so as to select the target wireless tag on the basis of the completion flag written when the estimated time is less than the predetermined period of time.

4. A reader and writer according to claim 1 or 2, wherein the selection of the target wireless tag, the data transmission/reception and the writing of the completion time information in the wireless tag are sequentially conducted for every single wireless tag.

5. A reader and writer according to claim 1, wherein the wireless tag comprises a time information writing unit adapted to write, to the storage unit, the completion time information on the data transmission/reception in the data communications a plurality of times, and the reader and writer comprises a tag selection unit adapted to select the target wireless tag from within one or the plurality of wireless tags on the basis of a history of plural pieces of completion time information written by the time information writing unit.

6. A data communication method for radio communications between a reader and writer and a wireless tag having a storage unit, said data communication method comprising:

executing data transmission or data reception between said reader and writer and a wireless tag;

transmitting completion time information indicating completion time of said data transmission or said data reception from said reader and writer to said wireless tag, said completion time information being stored in said storage unit; and transmitting, from said reader and writer to said wireless tag, a tag selection command including time information that is used by said wireless tag to judge whether said wireless tag is selected or not by comparing said stored time information and said completion time information.

7. A data communication method according to claim 6, wherein the wireless tag further includes a temporary storage unit enabled to temporarily store the data by its being supplied with electric power from the reader and writer, the data communication method further comprises a completion flag writing step of writing, when completing the data transmission/reception in the data transmitting/receiving step, a completion flag representing completion of the data transmission/reception to the temporary storage unit provided in the target wireless tag.

8. A data communication method according to claim 7, wherein the tag selection step includes estimating time required for the data transmission/reception in accordance with the content of the data transmission/reception executed in the data transmitting/receiving step, selects the target wireless tag on the basis of the completion time information written when the estimated time is equal to or longer than a predetermined period of time, and selects the target wireless tag on the basis of the completion flag written when the estimated time is less than the predetermined period of time.

9. A data communication method according to claim 6 or 7, wherein the selection of the target wireless tag, the data transmission/reception and the writing of the completion time information are sequentially conducted for every single wireless tag.

10. A data communication method according to claim 6 or 7, further comprising a time information writing step includes writing, to the storage unit, the completion time information on the data transmission/reception in the data communications a plurality of times with the reader and writer, and the tag selection step includes selecting the target wireless tag from within one or the plurality of wireless tags on the basis of a history of plural pieces of completion time information written in the time information writing step.

* * * * *